UNITED STATES PATENT OFFICE.

HARRY A. GOULD, OF ST. LOUIS, MISSOURI, ASSIGNOR, BY DIRECT AND MESNE ASSIGNMENTS, TO GRAIN PRODUCTS COMPANY, OF ST. LOUIS, MISSOURI, A CORPORATION OF DELAWARE.

FOOD PRODUCT AND PROCESS OF PRODUCING THE SAME.

1,186,768.  Specification of Letters Patent.  Patented June 13, 1916.

No Drawing.  Application filed March 27, 1916.  Serial No. 86,953.

*To all whom it may concern:*

Be it known that I, HARRY A. GOULD, a citizen of the United States, residing at the city of St. Louis, State of Missouri, have invented a certain new and useful Food Product and Process of Producing the Same, of which the following is a specification.

This invention relates to a certain new and useful food product and process of producing the same.

My present invention resides in the production and provision of a so-called substantially ready-to-serve palatable nutritious food product high in laxative properties.

My new food product is one which, with little or no waste, may be manufactured or produced, and correspondingly furnished to consumers, at relatively low cost and in finished form is preferably in the shape of small cakes which may be conveniently and readily compactly packed, and supplied to the consuming public, in small containers, cartons, or the like.

It is generally well known that bran, and particularly bran wheat, is high in laxative value, but bran, and especially bran of wheat, is of and by itself unpalatable and of no food value and is hence used as a food only, generally speaking, in exceptional cases, such as by persons afflicted more or less with constipation. A palatable food product including bran as an element or constituent for its known laxative value has accordingly been greatly desired by the general public, and many efforts have heretofore been made to supply the public with such a food product; but, so far as I am now aware, little success has attended the efforts of food manufacturers along these lines, the products produced finding comparatively little consumption and small sales. My new food product, however, which, as hereinafter more fully appears, has bran of wheat as its main element or base, has already found great favor and success with the purchasing public and is apparently filling a long-felt demand in this direction.

In my new food product I contemplate the combination or mixture with bran of wheat of food constituents or elements which in no way lessen or detract from the laxative value of the bran; on the contrary, these additional constituents or elements, being exceedingly nutritious and also high in laxative properties, give food value to the finished product and also contribute thereto an agreeable taste. As such additional constituents or elements, I preferably employ cracker-meal or other pre-cooked flour in powdered or pulverized form and an edible syrup.

My food product hence includes as essential elements bran, preferably bran of wheat, cracker-meal or other pre-cooked flour, and an edible syrup, these several ingredients or constituents being combined in the finished product, to obtain the best results, in the proportions approximately of one pound of cracker-meal and two and one-fourth pounds of syrup to approximately each four and one-half pounds of bran of wheat.

In the process of producing my new food product and in providing first the said edible syrup, I take approximately one pound of strained honey and approximately one and one-quarter pounds of molasses and mix the same together in a suitable receptacle; I then heat this syrup mixture until the same is of a relatively thin consistency, so that it will easily pour. I also in a suitable receptacle thoroughly mix the bran of wheat with, say, approximately one-half pound of the cracker-meal, and then pour into such mixture the relatively thin, hot syrup. I then add to the mass the other approximately one-half pound of cracker-meal, and then again thoroughly mix the said several elements together, the syrup, in addition to contributing food value to the finished product, acting or serving also as a binder, as it might be called, for the bran and cracker-meal, which are, respectively and preferably, in flake and pulverized form. The mass or mixture is now ready for toasting, but in order that the finished product may be conveniently handled and supplied to consumers, the same is first molded or otherwise formed into suitable shapes or cakes. Accordingly suitable relatively small individual molds of any desirable form or shape being provided and at hand, the same are respectively filled with the mass or mixture, the material in each mold being suitably compactly pressed therein. The several molds so filled are now reversely placed upon a plank or other preferably wooden toasting surface, the molds duly removed, and the several food-cakes with their supporting plank or other toasting surface placed within a suitable oven, under the heat of which the several food-cakes are permitted to remain a suitable length of time, approximately ten minutes, the several food-cakes being thereby toasted so as to dry, sterilize and relatively harden the same. On being removed from the oven, the several food-cakes are suitably cooled and are then ready for consumption, the cakes being preferably packed and wrapped for shipment in suitable containers, cartons, or the like.

Having thus described my invention, what I claim and desire to secure by Letters Patent is:

1. As a new article of manufacture, a food product composed of bran of wheat, cracker-meal, strained honey, and molasses.

2. As a new article of manufacture, a toasted food product composed of bran, pre-cooked flour, and an edible syrup.

3. As a new article of manufacture, a toasted food product composed of bran of wheat, cracker-meal, and an edible syrup.

4. As a new article of manufacture, a toasted food product in cake form, the same being composed of bran of wheat, cracker-meal, and an edible syrup.

5. As a new article of manufacture, a toasted food product in cake form, the same being composed of bran of wheat, cracker-meal, strained honey, and molasses.

6. As a new article of manufacture, a toasted food product in cake form, the same being composed of bran of wheat, cracker-meal, strained honey, and molasses in approximately the following proportions: bran of wheat, four and one-half pounds, cracker-meal, one pound, strained honey, one pound, and molasses, one and one-quarter pounds.

7. The process of producing the food product herein described, the same consisting of mixing bran of wheat and cracker-meal, heating an edible syrup to a relatively thin consistency, and then pouring the heated syrup into the mixture of bran of wheat and cracker-meal.

8. The process of producing the food product herein described, the same consisting of mixing bran of wheat and cracker-meal, heating an edible syrup to a relatively thin consistency, then pouring the heated syrup into the mixture of bran of wheat and cracker-meal, and then adding to the mass an additional quantity of cracker-meal.

9. The process of producing the food product herein described, the same consisting of mixing bran of wheat and cracker-meal, heating an edible syrup to a relatively thin consistency, then pouring the heated syrup into the mixture of bran of wheat and cracker-meal, then adding to the mass an additional quantity of cracker-meal and thoroughly mixing the mass, and then toasting the mass.

10. The process of producing the food product herein described, the same consisting of mixing bran of wheat and cracker-meal, heating a syrup composed of strained honey and molasses to a relatively thin consistency, pouring the heated syrup into the mixture of bran and wheat and cracker-meal, then adding to the mass an additional quantity of cracker-meal and thoroughly mixing the mass, then molding the mass into individual compact cakes, and then toasting the cakes.

11. The process of producing the food product herein described, the same consisting of mixing bran of wheat and cracker-meal, heating an edible syrup to a relatively thin consistency, then pouring the heated syrup into the mixture of cracker-meal and bran and thoroughly mixing the mass, and then toasting the mass.

12. The process of producing the food product herein described, the same consisting of mixing bran of wheat and cracker-meal, heating an edible syrup to a relatively thin consistency, then pouring the heated syrup into the mixture of cracker-meal and bran and thoroughly mixing the mass, molding the mass into individual compact cakes, and then toasting the cakes.

13. The process of producing the food product herein described, the same consisting of mixing bran of wheat and cracker-meal, heating a syrup composed of honey and molasses to a relatively thin consistency, pouring the heated syrup into the mixture of bran and cracker-meal and thoroughly mixing the same, molding the mass into individual compact cakes, and then toasting the cakes.

In testimony whereof, I have signed my name to this specification.

HARRY A. GOULD.